United States Patent
Krus

(10) Patent No.: US 9,835,219 B2
(45) Date of Patent: Dec. 5, 2017

(54) VIBRATION DAMPER FOR SHIELDING PLATE

(71) Applicant: FEDERAL-MOGUL SEALING SYSTEMS GMBH, Herdorf (DE)

(72) Inventor: Ralf Krus, Lindlar (DE)

(73) Assignee: Federal-Mogul Sealing Systems, Herdorf (DE)

( * ) Notice: Subject to any disclaimer, the term of this patent is extended or adjusted under 35 U.S.C. 154(b) by 0 days.

(21) Appl. No.: 14/779,705

(22) PCT Filed: Nov. 20, 2013

(86) PCT No.: PCT/EP2013/074275
§ 371 (c)(1),
(2) Date: Sep. 24, 2015

(87) PCT Pub. No.: WO2014/154307
PCT Pub. Date: Oct. 2, 2014

(65) Prior Publication Data
US 2016/0076615 A1    Mar. 17, 2016

(30) Foreign Application Priority Data

Mar. 25, 2013  (DE) .................. 10 2013 205 230

(51) Int. Cl.
| F16F 7/108 | (2006.01) |
| F02B 77/13 | (2006.01) |
| F16F 7/104 | (2006.01) |
| F16F 15/02 | (2006.01) |
| H02K 5/24 | (2006.01) |

(52) U.S. Cl.
CPC .............. F16F 7/108 (2013.01); F02B 77/13 (2013.01); F16F 7/104 (2013.01); F16F 15/02 (2013.01); H02K 5/24 (2013.01)

(58) Field of Classification Search
CPC . F16F 7/108; F16F 7/104; F16F 15/02; F02B 77/13; H02K 5/24
See application file for complete search history.

(56) References Cited

U.S. PATENT DOCUMENTS

| 1,995,245 | A | * | 3/1935 | Funk .................. F16F 1/445 |
| | | | | 267/141.5 |
| 2005/0253317 | A1 | * | 11/2005 | Yasumoto ............... F16F 7/108 |
| | | | | 267/140.11 |
| 2007/0069434 | A1 | | 3/2007 | Kato et al. |
| 2009/0113843 | A1 | | 5/2009 | Levit et al. |
| 2012/0168271 | A1 | * | 7/2012 | Ryaboy ................... F16F 7/116 |
| | | | | 188/379 |

FOREIGN PATENT DOCUMENTS

DE        195 31 280 A1    2/1997

* cited by examiner

Primary Examiner — Vishal R Sahni
(74) Attorney, Agent, or Firm — Robert L. Stearns; Dickinson Wright, PLLC

(57) ABSTRACT

The invention relates to a vibration elimination system, comprising a shielding plate (2) for a motor component, at least one vibration elimination element (10) that is fastened to the shielding plate (2), wherein each vibration damping element (10) comprises a spring-mass system that is capable of vibration, the spring force and mass of which are dimensioned such that said spring-mass system is matched to a predetermined vibration frequency of the shielding plate (2).

8 Claims, 3 Drawing Sheets

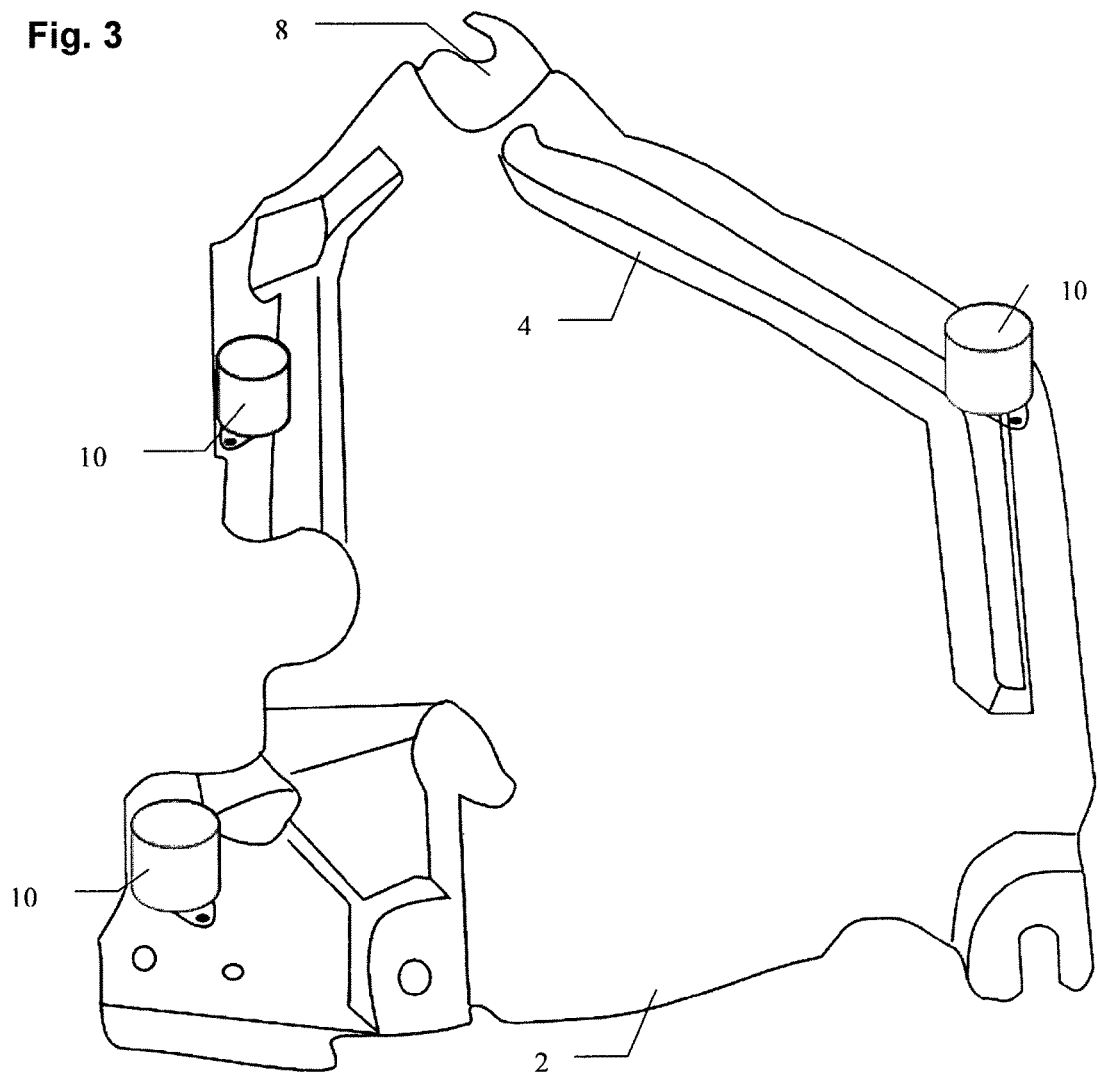

VIBRATION DAMPER FOR SHIELDING PLATE

BACKGROUND OF THE INVENTION

1. Technical Field

The invention relates to vibration dampers, in particular vibration dampers for shielding plates on motor components.

2. Related Art

Vehicle components such as heat shielding plates are stimulated to natural vibrations by motor vibration and by airborne sound generated by motor components. These vibrations can lead to undesired acoustic and stability-relevant impairments on the shielding plate.

Hitherto, the component vibrations are taken into consideration for example in that shielding plates and similar components are provided with reinforcing measures, for example with reinforcements through the introduction of ribs or corrugations into the plate geometry. However, it is often difficult, for manufacturing reasons or at locations having constricted installation space, to form an optimum corrugation distribution over the plate for purposes of reinforcement.

A further measure for reducing the component vibrations is the use of vibration decoupling elements, which are mounted between the components in the region of the fastening elements. Such elements can be, for example, elastomer elements inserted in the screw region. In this way, two components are decoupled from one another as far as possible, in order to thus reduce the vibrations for instance of a shielding plate. However, depending on the component, very many individual decoupling elements are necessary here, and for a captive mounting the decoupling elements are to be pre-mounted on the shielding plate, which substantially increases the effort during installation. In addition, the airborne sound in the motor region can also still be transferred to the plate, can lead to vibrations there and thus again produce an overall system which is capable of vibration.

SUMMARY OF THE INVENTION

According to the invention therefore, according to an embodiment, a vibration elimination system is provided, which comprises a shielding plate for a motor component and at least one vibration elimination element that is fastened to the shielding plate. The vibration elimination element comprises a spring-mass system that is capable of vibration, the spring force and mass of which are dimensioned such that said spring-mass system is matched to a predetermined vibration frequency of the shielding plate.

A vibration elimination element can be fastened for example in a region of maximum vibration deflection of the shielding plate, and/or a plurality of vibration elimination elements can be fastened at a predetermined distance around a region of maximum vibration deflection of the shielding plate. It is likewise possible that at least two vibration elimination elements are mounted on the shielding plate, which are matched to different vibration frequencies.

In an example embodiment, a vibration elimination element is matched such that it shifts an initial vibration frequency of the shielding plate into a predetermined frequency range. Alternatively, the vibration elimination element can be matched such that it damps a predetermined vibration frequency of the shielding plate or respectively reduces or eliminates a vibration with this frequency.

According to an embodiment, the vibration elimination element comprises an elastic casing, which provides the spring force of the spring-mass system, and a metallic oscillation mass, which is mounted in the elastic casing in a manner capable of vibration. In a further embodiment, the vibration elimination element comprises a metallic oscillation mass, which is mounted in a manner capable of vibration between two elastic elements which provide the spring force of the spring-mass system. In such vibration elimination elements, the spring-mass system can be surrounded at least partially by a fixed casing.

The oscillation mass is to be capable of vibration in operation (i.e. on stimulation of a vibration of the vibration eliminator) substantially parallel to the deflection direction of the region of the shielding plate in which the vibration elimination element is mounted.

DRAWINGS

The invention is described in further detail below with reference to the figures, wherein FIG. 1 shows an example shielding plate with mounted vibration elimination element;

FIG. 3 shows an example shielding plate with a plurality of vibration elimination elements.

DETAILED DESCRIPTION OF EXAMPLE EMBODIMENTS

Figure 1:
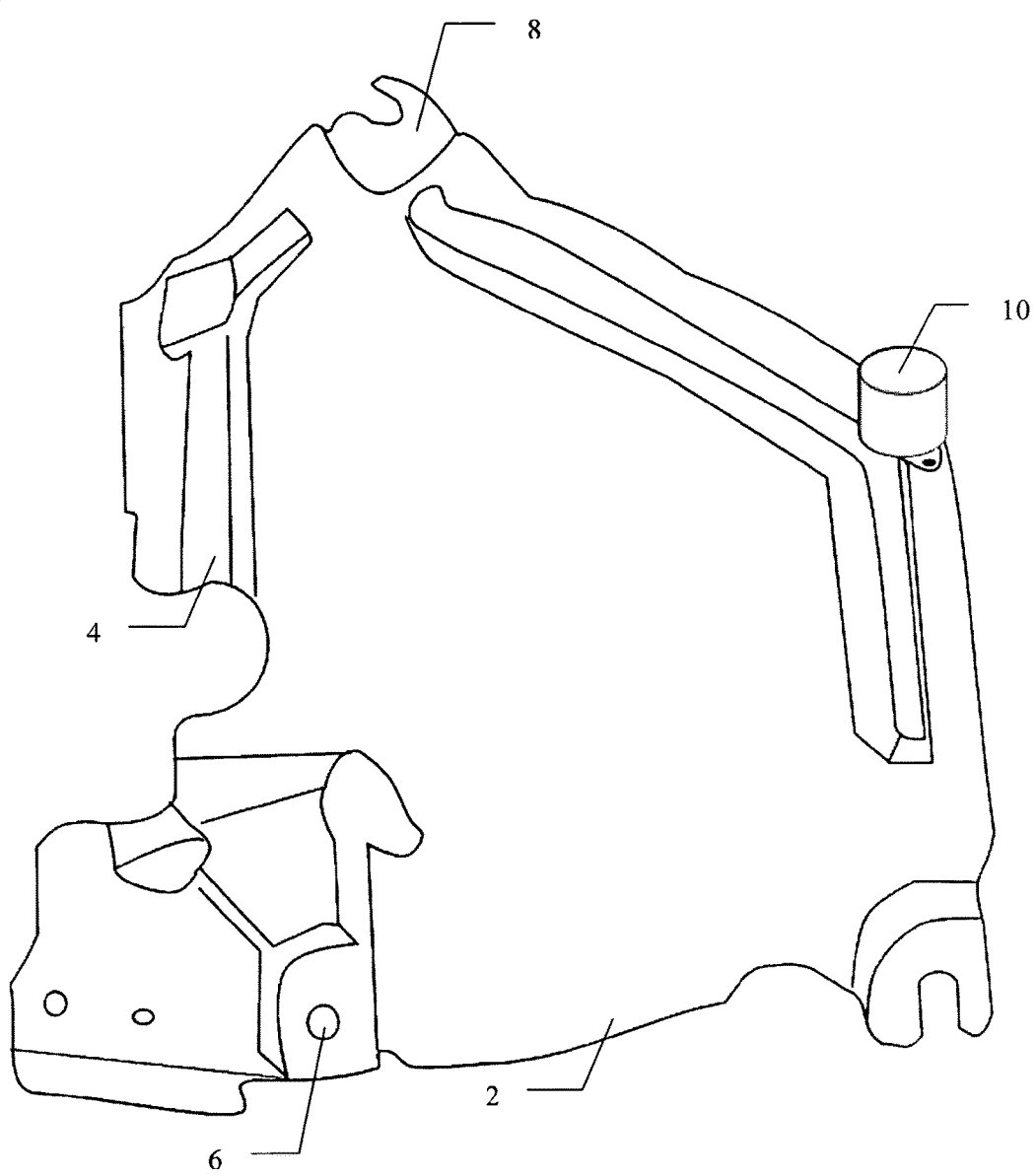

An example embodiment comprises a shielding plate 2 in the motor region of a vehicle as in FIG. 1. Corrugations, impressions and elevations 4 in the shielding plate are sketched by way of example by dot-and-dash lines; depending on the component, such impressions 4 can also be completely absent or configured differently. At the edge of the shielding plate, likewise as an example, through-holes 6 and fastening regions 8 are shown, by means of which the shielding plate 2 can be e.g. screwed or riveted to a component.

The vibrations of the shielding plate 2 which are to expected during operation can now be determined either from measurements on the installed component or predicted on the basis of calculations and/or simulations. Thus, for example, the natural resonance frequency of the shielding plate and the higher vibration modes can be determined. In this way, it can be established which frequencies will occur and which regions of the shielding plate will be affected particularly intensively by vibrations and resonances. Possibly, also, various similarly intensive vibrations also occur.

Now, as is shown in FIG. 1, according to the invention at least one vibration elimination element 10 is mounted on the shielding plate 2. The vibration elimination element comprises a spring-mass system that is capable of vibration, which is matched in its dimensions to the resonance(s) of the shielding plate. Through the component stimulation, the mounted vibration elimination element 10 is also set into vibration so intensively that it receives the kinetic energy of the shielding plate 2 and through counter-vibrations weakens or neutralizes it to such an extent that the critical vibrations are reduced or completely neutralized. In this way, depending on the structure, both noises and also stresses on the shielding plate 2 are substantially reduced and the durability is improved.

Figure 2A:
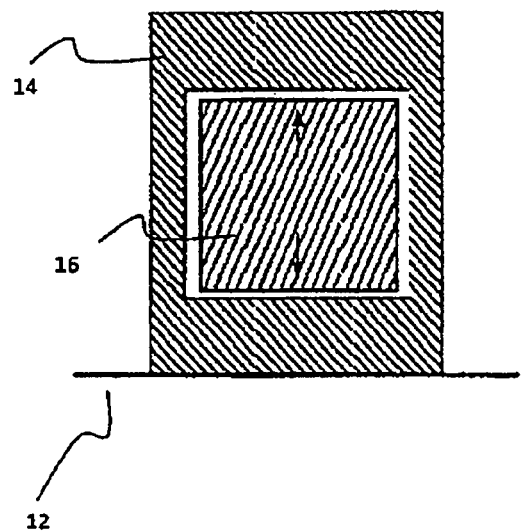
FIGS. 2a and 2b show vibration elimination elements in cross-section.

FIG. 2a shows a first vibration elimination element 10 in cross-section. The spring-mass system of the vibration elimination element comprises an oscillation mass 16, which is mounted in a suitable casing 14. The casing 14 can be made from an elastic material, as in FIG. 2a, for example from an elastomer, and can thus act as a spring element. Through the elasticity, the vibration of the oscillation mass 16, which can vibrate in the casing 14, is regulated. A possible alternative is shown in FIG. 2a, where a partially elastic material 24 is inserted into a fixed casing 18, e.g. in cylindrical form, only at the two ends, so that the mass 16 oscillates between these two resilient elastic insert elements 24.

Figure 2B:
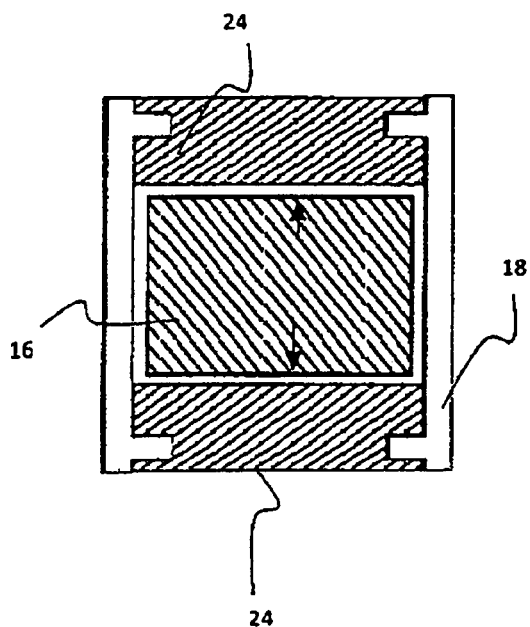

In the case of a stimulation of vibrations in the shielding plate 2, these are also stimulated in the elimination element 10 and bring about the movement of the oscillation mass 16 substantially parallel to the deflection direction of the plate vibrations, as is indicated by the arrows in FIGS. 2a and 2b. The deflection of the oscillation mass 16 is determined substantially by the elasticity of the elastic material 14, 24 above and below the oscillation mass. At the same time, the vibrations of the vibration elimination element 10 are again damped by the inner friction, so that the kinetic energy which is taken over is partially dissipated in frictional heat. The oscillation mass 16 can be provided for example by a metallic internal body. By selection of size, hardness of the elastic outer casing, weight of the mass and friction, the vibration elimination element 10 can be set optimally to the vibrations on the shielding plate 2 which are to be reduced or neutralized. Depending on the embodiment, an elimination element 10 can also be matched such that it shifts the undesired vibration frequency of the system to another, less critical, frequency.

The at least one vibration elimination element 10 can be mounted in any desired manner on the shielding plate 2. Preferably it is mounted on the outer side, i.e. on the side facing away from the heat source, in order to keep the thermal stresses on the vibration elimination element low. The mounting can take place for example by means of rivets.

Depending on the design, the vibration elimination elements can already have a circumferential or only partially circumferential fastening edge, in which fastening holes for e.g. rivet or screws are introduced. In the figures, elimination elements 10 are shown, which are provided with lateral flat lugs 12 as a fastening region. In a further embodiment, the shielding plate 2 could have at suitable locations for example depressions or projections, which facilitate a mounting of the vibration elimination elements. The manner of the mounting can be adapted optimally to the respective location of the vibration elimination element 10, so that the shielding plate 2 together with the elimination elements remains compact and flat as possible e.g. through depressions, in so far as spatial restrictions are present in this region in a vehicle.

Depending on the embodiment, on or more elimination elements 10 can be arranged on the shielding plate 2. For example, a single element could be mounted in the region in which the greatest oscillation paths by the component stimulation are expected, as shown as an example in FIG. 1. This region can be determined by practical measurements or by component simulations. It is also possible that a component has several regions with at least locally maximum stimulation/deflection.

Likewise, however, it is also possible to cover this one region by several vibration elimination elements, which are appropriately matched to one another and to the vibrations. The vibration elimination elements could then, for example, be arranged symmetrically around a vibration centre, i.e. for instance with a certain distance around the site of the maximum deflection of the plate. For this, two or more elements could be used.

In addition, it is conceivable to install a plurality of identically or differently configured vibration elimination elements in differently vibrating regions of a shielding plate. An example of this is shown in FIG. 3, where three individual vibration elimination elements 10 are mounted at different locations of a shielding plate. In this example, the plate 2 is formed as in FIG. 1 with elevations/depressions 4, fastening holes 6 and fastening regions 8, but again the form and embodiment of the shielding plate 2 could also be different. The different mounted elimination elements 10 can be matched to a shared or to different resonance frequencies. Thus, for example, different elimination elements could be mounted, in order on the one hand to attenuate mechanical vibrations which stress the shielding plate intensively, whilst other elements are used purely for acoustic damping and could be matched to resonances in the acoustic frequency range.

The materials of the vibration elimination element which are used have an influence on the vibration- or respectively damping behaviour of the elimination element. The hardness and elasticity of the resilient part, i.e. for example of the elastic casing 14 or of the elastic inserts 24, determines together with the mass (and possibly also the form) of the metallic vibration mass element 16 mounted therein the frequency of the elimination element 10. Here, the elastomer material should preferably be selected such that the determining characteristics such as the elasticity also remain under stress (heat etc.) or respectively only alter such that the change can already also be taken into consideration in the coordinating of the elimination elements. Depending on the site of use, the material is also to be resistant to chemical influences such as exhaust gases or oil. Optionally, it is also conceivable e.g. to cover an elastomer covering with a fixed capsule of plastic or high-grade steel, in order to thus obtain a resistant elimination element.

Instead of an elimination element as described above, in which a metallic mass 16 vibrates in an elastic casing 14, other elements 10 are also possible. Thus, for example, the spring force of the spring-mass system could be provided through the viscosity of a fluid. For this, a tight casing could be filled with an appropriately selected fluid (for example an oil), in which a metallic oscillation mass can move and thereby vibrate. Again other embodiments can have recourse to one or more spring(s), e.g. a spiral spring, fastened to the mass and to the casing.

The vibration elimination elements of the invention could be used as a single measure against component vibrations, likewise, however, they could also be combined in any desired manner with the measures hitherto from the prior art, i.e. with at least partially introduced reinforcement corrugations of the shielding plate or with decoupling elements at the fastening points of the plate. In this way, for example, different measures could be used for different frequencies which are to be reduced, so that e.g. a particular occurring vibration frequency is reduced by elimination elements, whilst the remaining occurring frequencies are further attenuated by decoupling. In such cases, the spring-mass dimensions of the vibration elimination element which is used could also be matched in advance specifically to a decoupled or resonating suspension.

Vibration elimination elements according to the invention can be used in the most varied of shielding plates. This applies both to the location of use of the plates and also to the production materials. Thus, metallic plates with or without coating, or for example heat shields of fibre materials can be used and protected from damage by the arranging of a vibration elimination element as described above. Likewise, it is conceivable that the elimination elements described above as examples can also be replaced by other elements having the same principle and combined with one another as desired.

The invention claimed is:
1. A vibration elimination system, comprising
a heat shielding plate configured to protect a motor component from heat,
at least one vibration elimination element, which is fastened to the heat shielding plate,
wherein each vibration elimination element comprises a spring-mass system that is capable of vibration, the spring force and mass of which are dimensioned such that said spring-mass system is matched to a predetermined vibration frequency of the heat shielding plate;
wherein the vibration elimination element comprises a metallic oscillation mass which is mounted in a manner where it is able to oscillate independently of the motor component and of the heat shielding plate, and
wherein the oscillation mass is mounted in a manner capable of vibration in an elastic casing which provides the spring force of the spring-mass system, and wherein the elastic casing is made of an elastomer and is fixedly mounted on the shielding plate, or
wherein the oscillation mass is mounted in a manner capable of vibration between two elastic elements, which provide the spring force of the spring-mass system, and wherein the elastic elements are made of an elastomer and are fixedly mounted on the heat shielding plate.

2. The vibration elimination system according to claim 1, wherein at least one vibration elimination element is fastened in a region of maximum vibration deflection of the shielding plate.

3. The vibration elimination system according to claim 1, wherein a plurality of vibration elimination elements are fastened at a predetermined distance around a region of maximum vibration deflection of the shielding plate.

4. The vibration elimination system according to claim 1, wherein at least two vibration elimination elements are mounted on the shielding plate, which are matched to different vibration frequencies.

5. The vibration elimination system according to claim 1, wherein at least one vibration elimination element is matched such that it shifts an initial vibration frequency of the shielding plate into a predetermined frequency range.

6. The vibration elimination system according to claim 1, wherein at least one vibration elimination element is matched such that it damps a predetermined vibration frequency of the shielding plate.

7. The vibration elimination system according to claim 1, wherein the spring-mass system is surrounded at least partially by a fixed casing.

8. The vibration elimination system according to claim 1, wherein during operation the oscillation mass is capable of vibration parallel to the deflection direction of the region of the shielding plate, in which the vibration elimination element is mounted.

* * * * *